Feb. 12, 1952         C. F. WALLACE         2,585,059
ELECTRICAL CELL APPARATUS FOR DETECTING
CHEMICAL CHARACTERISTICS OF LIQUIDS
Filed Dec. 24, 1946         3 Sheets-Sheet 3
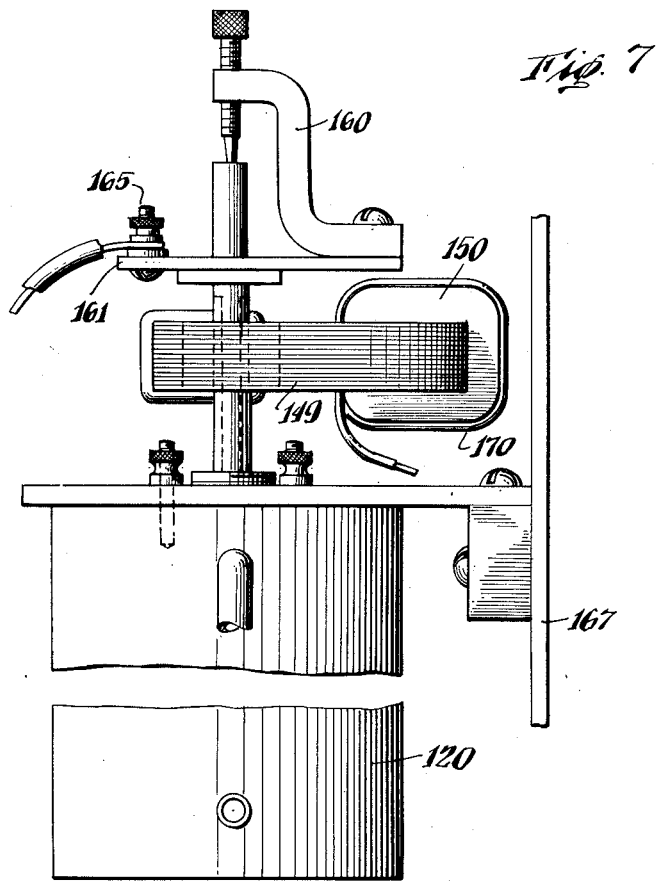
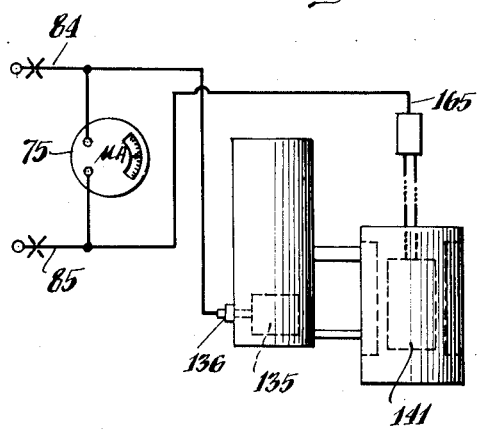
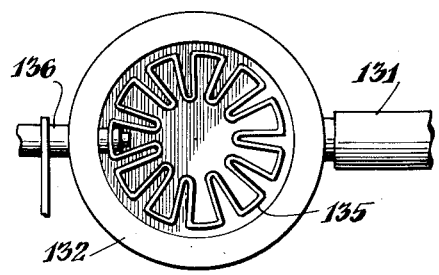
INVENTOR.
Charles F. Wallace
BY
Robert S. Dunham
ATTORNEY

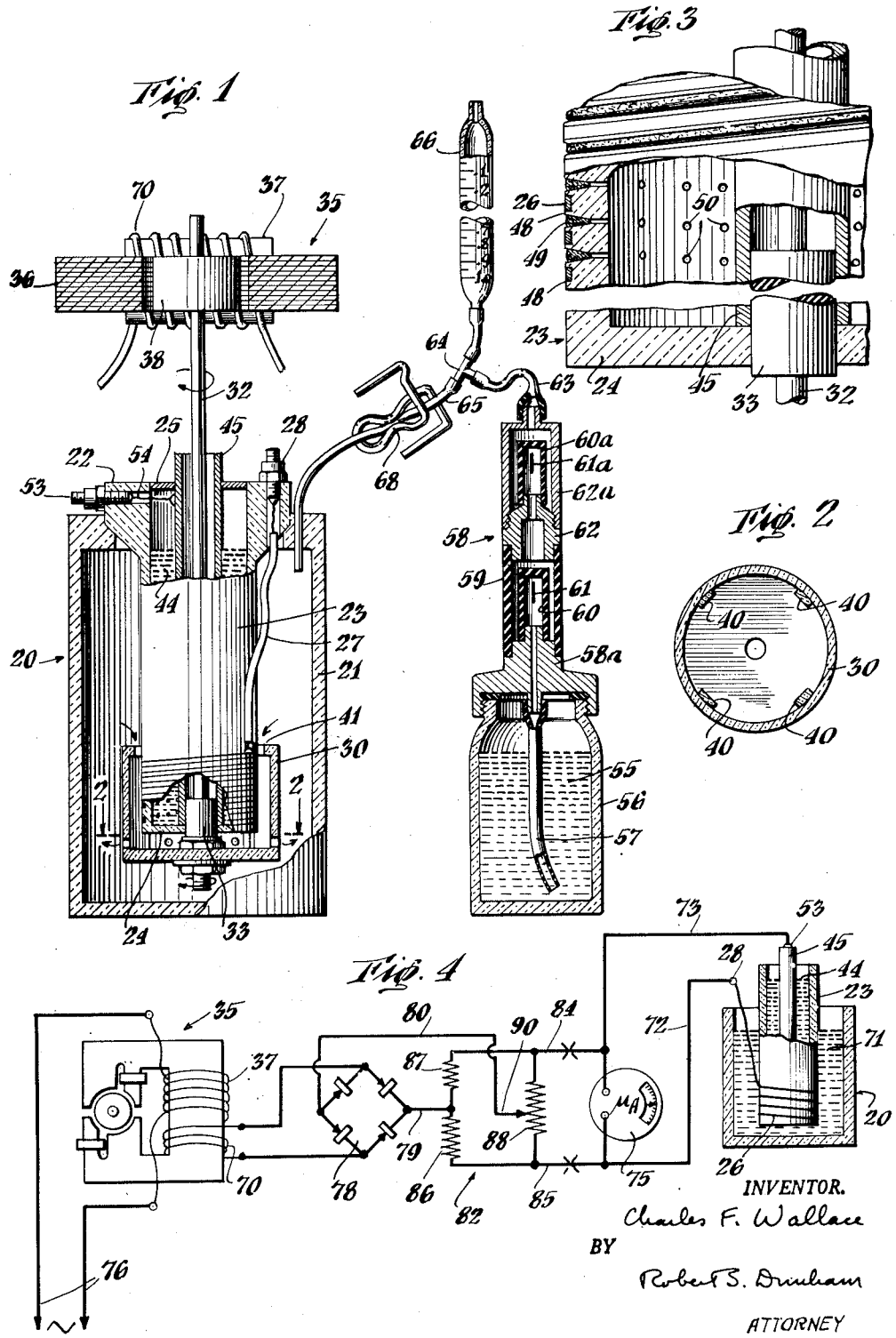

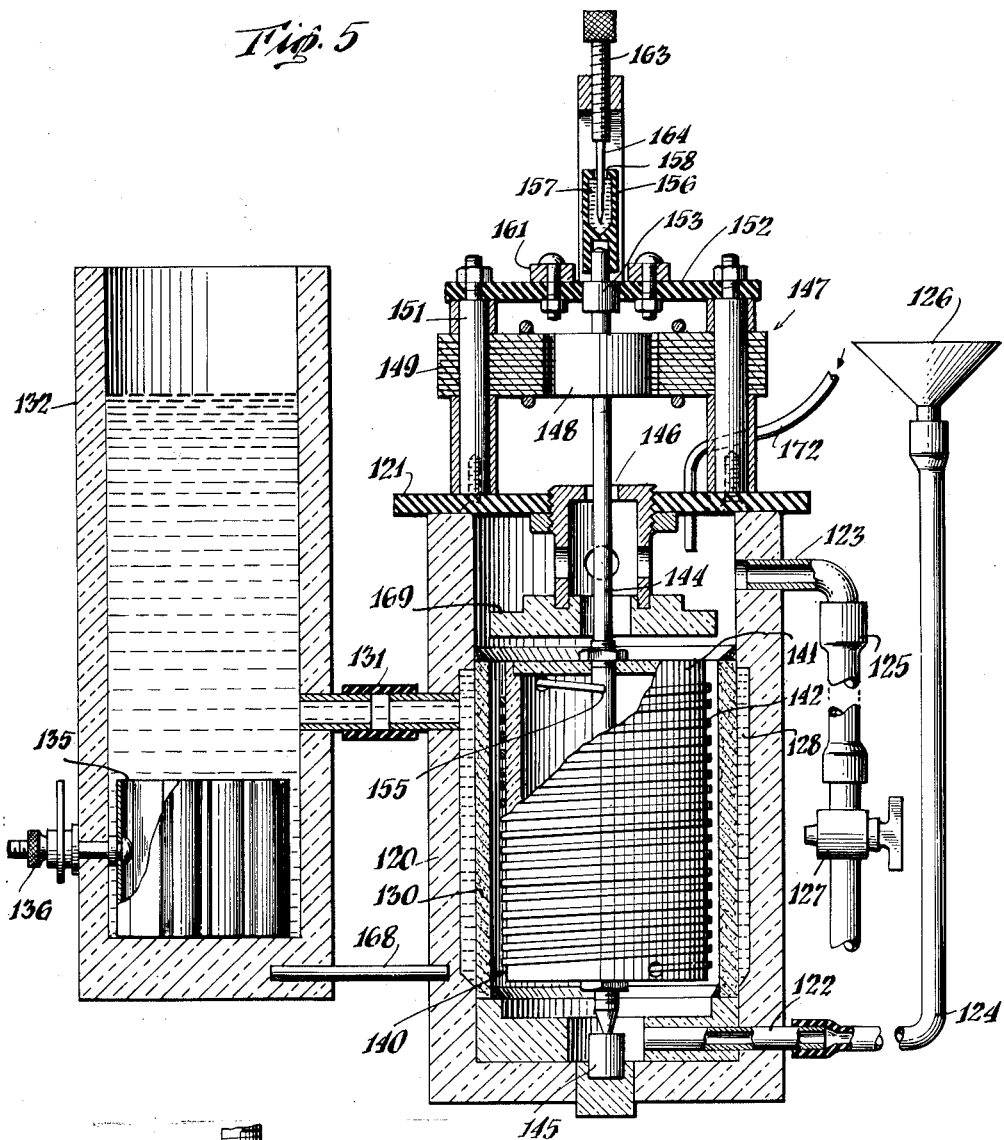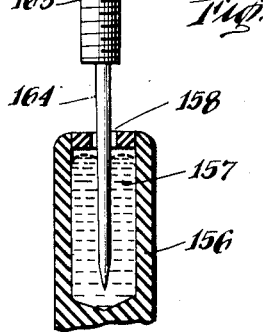

UNITED STATES PATENT OFFICE 2,585,059

ELECTRICAL CELL APPARATUS FOR DETECTING CHEMICAL CHARACTERISTICS OF LIQUIDS

Charles F. Wallace, Westfield, N. J., assignor to Wallace & Tiernan Products, Inc., Belleville, N. J., a corporation of New Jersey Application December 24, 1946, Serial No. 718,228

14 Claims. (Cl. 204—195)

This invention relates to electrical cell apparatus for detecting chemical characteristics of liquids, and more specifically to cells adapted for electrochemically detecting minute quantities of materials such as oxidizing or reducing substances. A notably important field of test and investigation for which various types of cells and systems have been used or proposed is in the determination of active chlorine, more specifically residual chlorine such as may be present in water, sewage or other aqueous liquid that has been subjected to chlorine treatment, e. g. for purification. Thus in testing and controlling such treatments, for municipal water supplies, sewage disposal plants and the like, it is generally recognized that the residual chlorine concentration of the treated liquid, correlated with the elapsed time between treatment and test, is a measure of the effectiveness of chlorination.

Cells to detect residual chlorine for such purposes may be used in a variety of ways, for example to provide a direct electrical response in accordance with the amount of residual or with changes in residual, the response being preferably suitable for recording or other indication or for controlling operation of the chlorinator; or the cell may serve as an indirect indicator, so to speak, in other testing procedures, of which titration methods are an important example, the cell being employed, for instance, to detect the end point of the titration. The sensitivity must be great in all cases, since the chlorine concentrations to be detected are usually of the order of a few parts per million or less, it being often desirable to detect a minimum of 0.1 p. p. m. and changes as small as 0.01 p. p. m.

Accordingly a chief object of the present invention is to provide improved cell apparatus of the character described, affording an accurate and reliable response and capable of use for a wide variety of purposes. Other objects are to provide rugged, efficient and yet highly sensitive cell structures suitable for delicate electro-chemical determinations, and to provide such cells having improved and more efficient electrode arrangements and means for effectuating the desired electrochemical activity. Further objects are to provide new and improved combinations of instrumentalities in electrical cell apparatus, including electrical biasing or adjusting means adapted for cooperation with the electrical output of the cell, and also to provide efficient and yet essentially simple titrating apparatus embodying cells of the character described, for chemical determination of minute quantities of a substance such as active chlorine in water or other aqueous liquid.

To these and other ends, such as will be hereinafter apparent or incidental to the use of the invention, certain presently preferred embodiments of the improved apparatus are herein disclosed and will serve, by way of example, to illustrate the principles of the invention.

Referring to the drawings, in which such embodiments are shown:

Fig. 1 is a view, chiefly in vertical section, of a titrator including one form of cell structure in accordance with the present invention;

Fig. 2 is a horizontal section, on line 2—2 of Fig. 1, of an impeller element shown in Fig. 1;

Fig. 3 is an enlarged fragmentary view, partly in vertical section and partly in elevation, of certain electrode structure in Fig. 1;

Fig. 4 is a wiring diagram suitable for apparatus such as shown in Fig. 1;

Fig. 5 is a vertical section of another embodiment of the improved cell;

Fig. 6 is an enlarged view of certain elements at the upper part of Fig. 5;

Fig. 7 is a side elevation, with a few supporting parts removed, of the device of Fig. 5;

Fig. 8 is a plan view of the left-hand portion of the device as seen in Fig. 5; and Fig. 9 is a fragmentary wiring diagram showing the cell of Fig. 5 embodied in the circuit of Fig. 4.

The electrical cell apparatus shown in Figs. 1–3 inclusive is designed primarily as a titrator, i. e. a testing device for determining a chemical characteristic, such as the residual chlorine content, of a liquid sample.

Referring to Fig. 1, the titrator includes a cell generally designated 20, comprising a vessel 21 having an opening in its upper wall in which is removably seated the enlarged upper portion 22 of an electrode structure 23. The structure 23 comprises an elongated cylindrical vessel extending down from the portion 22 into the receptacle 21, the electrode structure being closed at its lower end 24 and having a removable cover 25. To provide the actual electrode exposed to the liquid under test that is to be contained in the vessel 21, the lower part of the cylindrical surface of the body 23 is wound with several turns of thin platinum ribbon 26, for example 7 turns of $\tfrac{3}{32}$ inch wide ribbon. A connector 27, comprising a wire preferably having a sealed coating of insulation, extends to a suitable terminal 28 in the enlarged portion 22.

A cup-shaped cylindrical member 30 surrounds the lower part of the electrode structure 23, adjacent the winding of platinum ribbon 26 to serve as an impeller as hereinbelow described. The impeller 30 is mounted on the lower end of a shaft 32, which extends upwardly through the electrode structure 23, traversing a stuffing box or sealed bearing 33 that is mounted in the lower end 24 of the electrode structure and that is of insulating material at least at its outer surface. Means are provided for rapidly rotating the shaft 32, for example an electric motor generally designated 35, which may be one of various types but is here shown as a so-called shaded pole alternating current motor having core structure 36, an energizing winding 37, and a rotor 38 mounted on the shaft 32. For simplicity of illustration, supporting parts for the motor and cell, and likewise further bearings as required for the shaft 32, are omitted from the drawings, inasmuch as the provision of such parts and bearings will be readily understood. The members 21, 23 and 30 are made of non-conducting material, for example such as Lucite, hard rubber, glass or other composition appropriately inert to significant constituents of the liquid under test.

As shown, the cylindrical impeller 30 is coaxial with the electrode structure 23 and closely surrounds the latter, in fact preferably with a spacing closer than can be clearly represented in the drawings. The internal cylindrical face of the impeller may be provided with a plurality of vertical drag strips 40, for example four, as shown in Fig. 2, which are in the nature of shallow ribs extending from the bottom to the top of the inner cylindrical face. The upper edge of the impeller has a short inwardly turned lip 41, which cooperates in providing the desired flow characteristics for agitation of the liquid and particularly in avoiding undesirable cavitation effects. Around the lower part of the impeller wall, just above its bottom, are a plurality of holes 42, and it may be explained that on rapid rotation of the device, for example in the direction of the arrows, liquid in the vessel 21 is circulated down into the space between the impeller and the cylindrical body 23, i. e. past the lip 41, then rapidly around the surface of the electrode, and finally out through the apertures 42 into the main body of liquid. Thus a desirable agitation of the liquid is maintained immediately adjacent the electrode face, and likewise an appropriate circulation whereby various portions of the liquid contained in the vessel 21 are successively impelled along the described path.

The member 23, in the nature of a vessel, is adapted to contain a quantity of electrolyte such as the liquid 44, which is in electrical connection with the liquid in the vessel 21 through porous structure presently to be described. A further electrode, for example comprising a silver tube 45, extends into the electrolyte 44 to constitute therewith a half-cell to complete the electrical circuit. It will be noted that the tube 45 surrounds the shaft 32 and may extend to the bottom 24 of the electrode structure 23, being held in place by fitting over the bearing device 33 and by traversing an appropriate opening in the cover 25.

Referring to the enlarged view of Fig. 3, further presently preferred details of the lower part of the electrode structure may be described. Although the platinum ribbon 26 may in some instances simply be wound over the outer surface of the cylindrical body 23, a more rigid and durable structure is provided by embedding the ribbon in the surface of the cylindrical body, as shown at 48 in Fig. 3. That is to say, the ribbon is fitted into a helical groove of corresponding configuration on the outer surface of the cylinder 23. Intermediate successive turns of the helical groove are corresponding turns of another helical groove 49, which may be considerably deeper and may taper inwardly as shown. The groove 49 is packed with porous material, such as pressed cotton wick, and has a multiplicity of holes 50 extending from its inner end through the wall of the vessel 23. Thus the liquid in the vessel communicates through the holes 50 with the porous material 49, which in turn is exposed on its outer face to the liquid in the vessel 21, at a multiplicity of points that are close to the platinum ribbon electrode 26.

There being, for example, 7 turns of the platinum ribbon, the groove 49, packed with porous material, may extend for a corresponding 7 or 8 turns around the body 23, being in effect parallel to the ribbon, and having enough apertures 50 so that good contact is maintained with the liquid inside the body 23; there may be, for instance, from 5 to 20 such apertures per turn of the porous material. Thus the porous structure constitutes a permeable membrane intermediate the two liquids, whereby without susceptibility of actual flow in either direction they are electrolytically in contact, in a manner which will now be understood by persons skilled in the art. Electrical connection to the inner electrode 45 may be afforded by a terminal 53 having a conductor 54 leading to the electrode and mounted in the upper portion 22 of the cell structure.

For use in titration procedures, for example to determine residual chlorine concentration by titration with sodium arsenite, a supply of the reagent to be used, e. g. arsenite solution, may be contained in an appropriate bottle 56. A flexible conduit 57 extends into the liquid 55 in the bottle, and through a passage in a plug 58a for the cap of the bottle, communicates with a manually operable pumping device 58, which may comprise a hollow cylindrical body 59 of resilient flexible material such as rubber, Tygon, Transflex, or the like. Within the chamber 59 the open end of the plug passage is enclosed by an elongated cylindrical or cup-shaped member 60 of similar and resilient material, the member 60 being closed except for a slit 61 in its side wall. A passage in a plug 62 closing the top of the cylinder 59 opens into another elongated resilient cup 60a having a slit 61a, identical with the cup 60, and enclosed by a cap 62a which has its skirt threaded on the plug 62, and which communicates at its top with a further conduit 63. The cups 60, 60a constitute check valves for the suction and discharge sides respectively of the pump chamber 59, the slits 61 and 61a being normally closed. To advance liquid along the conduit line 57—63, the chamber 59 is simply pinched and released one or more times with the fingers. On each compression, liquid is forced out of the chamber up to the conduit 63, the pressure causing the edges of the slit 61a to spread apart and permit flow of liquid, while the slit 61 remains closed. On each release and reexpansion of the chamber wall 59, suction is developed, closing the slit 61a and causing the walls of the slit 61 to be spread apart, and at the same time drawing liquid up from the bottle 55 into the pump chamber.

The conduit 63 communicates with the T-shaped connector 64 in a further line 65 of flexible conduit that extends from a graduated pipette 66 down into the vessel 21 as shown. Valve structure may be provided for the conduit 65 between the T-element 64 and the vessel 21, for instance the pinch clamp somewhat diagrammatically indicated at 68, which is spring-biased to close the conduit 65 but which may be manually pinched to open the conduit so long as pressure is applied. Although the pumping device 59 may be even smaller than its relative proportions in Fig. 1 indicate, it may be sufficient (if previously filled with liquid) to provide a complete charge for the pipette 66 with a stroke or two, i. e. by compressing it only once or twice with the thumb and finger. It will be understood that the vessel 56 may be considerably larger, relative to other elements of the apparatus, than actually indicated in the drawing, and indeed likewise the cell vessel 21, to whatever extent is desired for accommodation of the necessary quantity of liquid.

Although in some cases the electrical output of the cell, which may be employed to generate a current variable in accordance with the amount of active chlorine in the liquid enclosed by the vessel 21, may be read or utilized simply by direct connection with a meter or other translating device, accuracy of calibration or of reading may be facilitated by the provision of appropriate biasing means in the cell circuit. While other electrical biasing means may be employed, a simple and convenient arrangement, involving an economy of structure, comprises a supplemental winding on the core 36 of the motor 35, so that an appropriate E. M. F is induced in such winding when the motor is energized by alternating current. Thus for example, 7 or 8 turns of insulated wire 70 around the periphery of the energizing winding 37 may constitute such a coil, and may be connected as hereinbelow described, for supply of biasing current in the cell circuit.

Referring to Fig. 4, which shows one form of simple electrical circuit suitable for a titrator of the sort shown in Fig. 1, the cell 20 is illustrated in simplified form having its platinum ribbon electrode 26 exposed to the liquid 71 under test, and having its inner electrode 45 in communication with an electrolyte such as a saturated solution of sodium chloride 44, which is disposed within the cylindrical body 23 and electrically connected to the liquid 71 through porous partitioning means, as shown in Fig. 3. The terminals 28 and 53 of the cell are connected by leads 72 and 73 respectively to a translating device such as a microammeter 75. For energization of the motor 35 its winding 37 may be connected to a source of current such as a commercial 110–120 volt A. C. line 76. The supplemental winding 70 on the motor is connected to the input terminals of a bridge type fullwave rectifier 78, of the copper oxide, selenium or other suitable type, which in turn has its output terminals connected, by the conductors 79, 80, across opposite or input junctions of a resistance bridge generally designated 82. The complementary junctions, or output terminals of the bridge, are in turn connected by conductors 84, 85 across the cell and the microammeter 75 in parallel.

The resistance bridge 82 includes a pair of fixed resistors 86, 87, respectively constituting two legs of the bridge, and a further resistor 88 having an adjustable center tap or movable contact 90. The contact 90 constitutes one of the input junctions of the bridge, so that the portions of the resistor 88 on either side of the contact thus comprise the other two legs of the bridge. It will be seen that the bridge input from the rectifier consists of the contact 90 and the junction of resistors 86, 87, whereas the output terminals are respectively the junction of resistor 87 and one end of resistor 88, and the junction of resistor 86 with the other end of resistor 88. In consequence, adjustment of the movable contact 90 provides adjustment of such E. M. F. as appears across the terminals 84, 85, the range of the illustrated arrangement being such that the bridge may be balanced for zero bias on the meter 75 or may provide a current flow in either direction, depending on the direction in which the contact 90 is moved from the position of balance. As will hereinafter appear, the circuit thus affords provision for a biasing current through the microammeter 75, in addition or opposition to such current as is directly applied to the meter from the cell 20, to provide initial adjustment of the zero or other operating point of the meter.

Although the dimensions and proportions of parts, and likewise the parameters of the electrical circuit, may be varied to suit the type of titration or other application of the cell in use, the following values are set forth by way of example, representing a specific structure that has been found of advantage for the determination of residual chlorine by titration with sodium arsenite. In this particular apparatus the cylinder 23 had an outside diameter of 1 inch and the effective electrode 26 comprised 7 turns of $\frac{1}{32}$ inch wide platinum ribbon, the turns being spaced so that the electrode was distributed over an axial distance of about $\frac{1}{2}$ inch on the cylinder. The axial or vertical dimension of the cup 38 was about $1\frac{3}{8}$ inch and the clearance between its inside wall and the outer surface of the cylinder 23 was conveniently very small, i. e. about $\frac{3}{64}$ to $\frac{1}{16}$ inch. The holes 42 were of about $\frac{3}{32}$ inch diameter, eight of the same being spaced around the circumference of the cup. The outer diameter of the cup was $1\frac{1}{4}$ inches and the internal drag strips 40 projected inwardly $\frac{3}{32}$ inch and had a width of $\frac{1}{16}$ inch. The total actually exposed area of the platinum ribbon was about 0.7 square inch, but by virtue of its distributed arrangement, its effectiveness as an electrode is believed to be practically the same as if the entire surface of the cylinder 23 in the region of the ribbon, were covered with platinum, so that the illustrated arrangement is of distinct advantage from the standpoint of economy.

The pipette 66 was adapted to hold 1 milliliter (approximately 1 cc.) and was appropriately graduated, for example in tenths and smaller parts of a milliliter. With the motor energized from a 115-volt 60-cycle A. C. source, the 7-turn winding 70 was found to yield about 0.4 volt, and as illustrated, this alternating voltage was converted to D. C. by the rectifier 78, which was of the selenium type. The D. C. microammeter 75 had a coil resistance of about 350 ohms and a normal full scale range of 4 microamperes, and in the resistance bridge the resistors 87 and 86 were respectively 5,000 and 15,000 ohms, and the total value of the resistor 88 was 5,000 ohms. The positive terminal of the rectifier was connected to the lead 79, and the meter terminal intended for connection to the positive side of the current flow under measurement was connected to the line 85—72. The motor operated at about 2400 R. P. M., therefore rotating the impeller cup 42 at this speed. The internal electrode 45 was a sterling silver tube, of ¼ inch outside diameter, exposed on its outer surface to the electrolyte 44, a saturated solution of sodium chloride.

It will be readily appreciated that the instrumentalities shown in Fig. 1 may be employed in a variety of titrating procedures. By way of example one such procedure that has been found particularly valuable for measuring residual chlorine concentration, as in water that has been treated with chlorine to purify it for drinking and like purposes, involves essentially the same sequence of manipulative measuring and computing steps as are described in a paper by H. C. Marks and J. R. Glass, entitled "A New Method of Determining Residual Chlorine," published in the Journal of the American Water Works Association, vol. 34, No. 8 (August 1942), at pages 1227 to 1240. Although the present apparatus represents means improved in a number of important repects in accordance with the present invention, relative to the devices shown and described in the cited paper, and although the electrical system here shown is likewise of a different and improved form, the reagents, manipulative procedure, and method of utilizing readings, may be the same as disclosed in the cited paper, to which reference may be had, for example, for a discussion of the arsenite reaction and its reliability as a titration reagent with electrochemical detection of the end point.

In making a titration with the present apparatus, the desired arsenite reagent is placed in the bottle 56, for example a 0.00282N solution of sodium arsenite. A sample of the chlorinated water to be tested is placed in the cell 20, the electrode structure including the projecting portion 22 being removed for this purpose, and then appropriately replaced. The electrical circuit being energized, the motor 35 is set in operation to rotate the impeller cup 30 at the desired rapid speed. By actuating the pumping device 53 the pipette 66 is filled with arsenite solution, say to contain 1 ml., the clamp 68 remaining closed at this time.

The contact 90 is then adjusted so that the needle of the microammeter rests at an appropriately high point, having in mind that the titration procedure involves a decrease in current from the cell 20, as the residual chlorine is reduced by the arsenite, so that the subsequent readings will be of lesser currents through the microammeter. Under ordinary circumstances the biasing current supplied from the resistance bridge 82, and thus from the winding 70, should flow through the microammeter in the direction opposite to the current from the cell, thus partially overcoming the "zero residual" current of the cell, i. e. the current that the cell will develop if no residual chlorine is present. It will be noted that as a cell the terminal 28 of the platinum electrode is positive, i. e. the cell current flows from this terminal through the meter to the negative terminal 53.

The clamp 68 is then opened for successive short intervals, so as to introduce successive measured quantities of the arsenite solution into the cell, the quantities being read from the pipette 66. For example, successive additions of 1/10 or of 0.05 ml. may be effected. The initial reading of the microammeter having been recorded, its changed position is noted after each such small addition of arsenite solution, appropriate time being allowed in each instance, say 10 or 15 seconds, to insure the chemical reaction. After a series of such additions it will be observed that the microammeter reading, which has been falling to lower and lower values, ceases to fall, and the end point is taken as the total quantity of arsenite that has been introduced up to the time when no further change in current occurs. If the end point is not reached when one filling of the pipette 66 has been used up, the pipette may be refilled from the bottle, and the procedure continued, with further refillings as necessary.

As will now be understood, with knowledge of the quantity of arsenite solution used to reach the end point, and of the strength of the arsenite solution, and of the amount of the water sample contained in the cell, the residual chlorine concentration may be accurately calculated. For example, if the arsenite solution is 0.00282N and the cell contains 0.1 liter of the water under test, then each 0.1 ml. of arsenite solution corresponds to 0.1 p. p. m. of residual chlorine. Or if a more sensitive measurement is desired, and if 0.25 l. of the liquid under test is contained in the cell, use of sodium arsenite solution of the strength of 0.000705N will provide an equivalence of 1.0 ml. of the arsenite to 0.10 p. p. m. of chlorine. It will thus be apparent that by the use of various strengths of arsenite solution, and also by the use of other measured quantities of water in the cell, different proportional relationships can be obtained, as may be desirable for the convenience of a particular determination.

Figs. 5 to 9, inclusive, show another form of electrical cell apparatus embodying my invention, which also has been found to be peculiarly effective for detecting chemical characteristics or changes of the sort described above, e. g. residual chlorine content in water or other aqueous liquid.

In this further embodiment the cell comprises a cylindrical cup-shaped container 120 having a cover 121 and inlet and outlet openings respectively traversing lower and upper portions of the receptacle wall and constituted by metal nipples 122, 123 to which appropriate conduit connection may be made, as by the flexible tubing portions 124, 125. For use in a titrator, the tube 124 may extend to a receiving funnel 126 at a level above the top of the cell, and the tube 125 may serve as an overflow line, being provided with a normally closed valve or stopcock 127. The receptacle is preferably made of insulating, i. e. non-conducting, material such as glass, hard rubber, Lucite, or other composition inert to the chlorine or other significant constituent of the liquid under test. Other non-conducting portions of the cell may be made of similar material or materials, so that further specific reference thereto is unnecessary. Metallic elements, such as the cover 121 and the nipples 122, 123, that are exposed to the treated water may also advantageously be made of, or surfaced with, a metal relatively unaffected by chlorine; thus for example, it may be understood that unless otherwise specified, such metal parts are made of silver or are silver plated, the same being true of the device of Figs. 1–3.

A part of the inner face of the container 120 is undercut or recessed to provide a cylindrical chamber 128 of annular form, closed on the inside by a tubular body 130 sealed in place at its ends and made of porous material such as unglazed porcelain, so as to provide a permeable membrane between the chamber 128 and the principal part of the space enclosed by the receptacle 120. It will be appreciated that the porous partition 130 serves to provide electrical connection between liquid in the central part of the receptacle and liquid in the surrounding chamber 128, by electrolytic conduction but without appreciable exchange or transfer of liquid, in exactly similar fashion to the corresponding porous structure in Figs. 1-3. Through connecting conduit structure 131 the chamber 128 communicates with an auxiliary receptacle 132, similarly made of insulating material and containing an electrode 135 made of a long ribbon of silver folded or curved into a rosette configuration as shown in Fig. 8, so as to provide a desirably large surface area. For electrical connection, a terminal 136 extends through the wall of the receptacle 132, from the electrode 135.

The cell also includes, in the receptacle 120, a cylindrical, rotating electrode structure generally designated 140 and comprising a closed cylindrical support 141 of insulating material disposed coaxially with the receptacle and within the porous partition 130. Around the periphery of the cylinder 141 are wound a number of turns of fine platinum ribbon 142, spaced so as to constitute a multiplicity of conductive surfaces spaced and distributed over the large area comprised by the underlying cylindrical surface. The supporting body 141 is mounted on a vertical shaft 144 seated at its lower end in a thrust bearing 145 and traversing a clearance hole 146 in the cover 121. The shaft 144 is rotated by an electric motor generally designated 147, and although a variety of driving means may be employed, as in the case of Fig. 1, there is shown a small alternating current motor of the shaded pole type, having a rotor 148 mounted upon an upper part or extension of the shaft 144, cooperating with suitable core structure 149 having an energizing winding 150. The motor is carried on appropriate supporting means 151 secured to the cover 121, the supporting means extending above the core structure to mount a transverse insulating plate 152 which carries an upper bearing 153 for the shaft 144.

Electrical connection to the exposed electrode constituted by the platinum ribbon 142 is made by connecting one or both ends of the ribbon to the shaft 144, as at 155 in Fig. 5, and by further electrical connection from the shaft to the desired external circuit. For the latter purpose the upper end of the shaft carries a vertically elongated metal cup 156 filled with mercury 157 (see also Fig. 6) and closed at its upper end by a disk or washer 158 of insulating material having a small central hole. A bracket 160 extending above the cup 156 and mounted on a metal supporting plate 161 carried by the panel 152, supports a threaded member 163 which at its lower end has a needle-like projection 164 extending through the opening in the disk 158 and into the mercury 157. The member 163 may be turned, by virtue of its threaded engagement in the bracket, to adjust it in position vertically, and a very slight clearance is provided between the circumference of the hole in the disk 158 and the periphery of the needle 164. In this fashion, as the shaft 144 and the electrode 140 are rapidly rotated, positive and continuous electrical contact is afforded between the needle 164 and mercury 157, and connection to an external circuit may be had by a terminal 165 on the plate 161. Varying contact potentials and other minor electrical variations, occasioned by the use of slip rings, brushes or the like, are avoided, yet at the same time the structure is compact and rugged, the disk 158 effectively serving to prevent loss of mercury from the cup 156 when the latter rotates or even if the apparatus should be inadvertently upset.

The receptacle 132 is filled with a suitable electrolyte, such as a saturated solution of sodium chloride, and by virtue of its communication with the chamber 128 and the exposure of the electrode 135 in the receptacle, constitutes a half cell, to complete the cell otherwise comprised by the electrode 140 and the liquid in the main part of the receptacle 120. The receptacle 120 can be appropriately mounted, as upon a supporting panel 167 (Fig. 7), and the receptacle 132 can be effectively supported from the vessel 120 by the connecting conduit 131 and a cooperating pin 168 having its ends embedded in the two vessels respectively. In use of the cell a measured quantity of water or other aqueous liquid to be tested can be introduced through the funnel 126; or if the level of the overflow conduit 125 represents a known quantity of liquid in the cell, the valve 127 can be opened and liquid can simply be poured in the funnel until it overflows through the line 125—the valve thereupon being closed. The rapid rotation of the cylindrical electrode 140 produces violent agitation of the liquid, particularly in the sleeve-like space between the outer surface of the electrode and the inner surface of the porous partition 130. If desired, baffle structure such as the disk 169 of insulating material suspended from the cover 121 and above the cylinder 141, may be included to provide better flow or turbulence characteristics for the liquid in the cell, particularly to avoid undesirable effects at the upper end of the annular space between the cylinder 141 and the porous sleeve 130. This baffle structure is especially useful where the cell is employed for continuous measurement, as with a continuous flow of liquid into the inlet 122 and out of the outlet 123.

As in the case of the embodiment of Figs. 1-3, the cell of Figs. 5-9 has been found to exhibit remarkable sensitivity to residual chlorine, i. e. to concentrations of active chlorine, and to changes in such concentrations, of the order of small fractions of a part per million. More specifically, when the cell has dimensions and characteristics such as are stated hereinbelow by way of example, it is capable of generating a current, between its terminals 165 and 136, which is representative of minute quantities of residual chlorine or the like in the liquid under test, and which is relatively quite large, i. e. remarkably large for a sensitive electro-chemical testing instrument, and in fact sufficient to actuate meters or control devices of considerably more rugged and powerful character than an ordinary micrometer. Similar results may be had with the embodiment of Figs. 1-3, especially where the effective areas of the exposed electrode 26 and of the porous structure in the groove 49 are increased, say, to several or more times the values represented by the specific example of dimensions given hereinabove.

In all cases, however, and in accordance with present understanding, important contributions to the sensitivity and effective electrical power of each type of cell are provided by the large or distributed extent of the exposed electrode material, by the violent motion of the liquid between the exposed electrode and the localities (i. e. the exposed surface of the porous structure in each instance) of further connection to the liquid, as by rotation at, for instance, 2000 to 5000 R. P. M., and by the extremely close spacing of the electrode and the porous structure (e. g. not more than about 1/8 inch) whereby the electrical path through the liquid is extremely short. It is believed that by virtue of the cooperation of these factors, the oxidizing character of a substance such as active chlorine in the liquid can manifest itself in the generation of a considerable and representative current between the terminals of the cell, without unwanted effects due to other substances that might affect the electrical conductivity of the water or other aqueous liquid to an extent measurable in other types of cells, and without undesirable surface effects at the ends of the current path in the liquid (e. g. polarization of irreductible extent at the exposed platinum electrode), such as may occur, for example, in the absence of rapid agitation.

Although the electrical path in the water from the porous membrane 130 to the platinum electrode ribbon 142 is so very much shorter than that to the exposed portions of the shaft 144 and its connected metal parts that such portions and parts may for many purposes have no adverse effect on the electrical response of the cell, and will almost certainly have no such effect if they are made of (rather than merely plated with) a noble metal, it may be advantageous for maximum sensitivity, especially when these exposed elements are made of plain or silver-plated base metal, to cover them, as completely as possible, with an insulating sheath or coating.

If the cell of Figs. 5–8 is embodied in titrating apparatus of the type shown in Figs. 1–4, it will be understood that similar means for supply of titrating reagent may be employed, although not shown in Figs. 5–8, and the motor 147 may have a supplemental winding 170 corresponding to the winding 70 and serving the same purpose as in Fig. 4. Thus in use the titration operation will be the same, the reagent being introduced in successive measured amounts through a conduit 172 (Fig. 5) to the liquid under test in the cell. Fig. 9 shows electrical connection of the cell of Fig. 5 in a circuit such as that of Fig. 4, including the microammeter 75; it will be understood that remaining parts (not shown) of the circuit to the left of the characters x—x may be identical with like parts of the circuit of Fig. 4, employed in the same manner.

While it will be appreciated that the dimensions, values and proportions of various structural and electrical parts may be varied to suit different circumstances of use in the case of each embodiment of the invention, a specific set of values for the cell of Figs. 5 to 8 will now be given by way of example, as representing conditions found satisfactory for the generation of relatively considerable currents, as explained hereinabove, in detecting minute quantities of residual chlorine or the like in water or other aqueous liquid. Thus in one such instance, the cylindrical member 141 had an outside diameter of $1\frac{1}{16}$ inches and a length of 2½ inches and was wound with 18 turns of $\frac{3}{32}$ inch wide platinum ribbon, the turns being appropriately spaced so that practically the entire surface of the cylinder was distributively covered by the electrode ribbon. The permeable membrane 130 comprised a cylindrical sleeve or shell approximately $\frac{3}{32}$ inch thick and having an inside diameter of 1¾ inches whereby the spacing between the electrode and the inner face of the porcelain sleeve was about $\frac{3}{32}$ inch.

For distinctly superior results as explained above, the area over which the exposed electrode is distributed should be relatively large, e. g. of the order of one and one-half to two square inches, and in fact such area may be considerably greater (i. e. at least several square inches and advantageously upwards of five square inches) where it is desired to operate a rugged type of translating device, the actual electrode occupying, say, about 15% or more of such area. Thus in the specific cell last mentioned above, the platinum ribbon winding was spaced over a total surface of about 12 square inches, the actual area of exposed platinum being about 2.75 square inches.

As the electrolyte in the half cell facing the side of the porous partition (in Fig. 1 or Fig. 5) opposite to that exposed to the liquid under test, a saturated aqueous solution of sodium chloride has been found entirely satisfactory, but it will be understood that other electrolytes of good conductivity may be employed, such as solutions of other chlorides, or of mineral acids or of sulfates or other mineral acid salts of alkali metals, or the like. The electrodes 45 and 135 were of silver, although in many cases other electrode structures, e. g. of gold or copper, may be used for electrical connection to the electrolyte in the cylinder 23 or the vessel 132. In the described example of Fig. 5 the electrode 135 comprised a silver ribbon 1¼ inches wide curled as shown to provide an extensive surface fitting within the vessel 132, the latter in turn having an inside diameter of 1½ inches and being, say, 3½ inches tall. The inner face of the porous membrane 130 was practically coextensive with the outer surface of the cylinder 141, and the latter was rotated by the motor 147 at about 2400 R. P. M., so that the water under test was violently carried around and agitated.

Under these conditions, the cell was found to be capable of delivering a current, between its terminals 136, 165, ranging from about 0.05 milliamperes for zero residual chlorine in water of ordinary characteristics, to 0.5 milliamperes for 1 p. p. m. free residual chlorine, and to correspondingly higher values for greater residuals. For use with such a cell the meter 75 may have a range of 0–1000 microamperes or more. As further evidence of the characteristics of the cell, its open-circuit voltage was found to be about 200 millivolts, for a free residual chlorine content of 1 p. p. m. According to present understanding, the negative ion flow in the cell is from the platinum or similar electrode 140 through the water under test to the porous membrane, and from the latter negative ions in the electrolyte of the accompanying half cell flow to the silver electrode 135. It may also be noted that in practice, where the cell is continuously in use for response to a flow of water through its principal chamber, any theoretically deleterious effects due to chemical reaction on the silver electrode in the vessel 132, for example such as might tend to build a non-conductive coating upon it, are found to be obviated by some gradual dissolution of silver from the electrode surface.

Although other electrode materials may be employed, such as silver, gold, platinum-iridium alloy, or graphite (graphite being used for instance as the material of the cylinder 141, or the cup 30 in Fig. 1 being made the exposed electrode, of graphite, with the cylinder 23 then simply a porous vessel), and although other electrode configurations may be adopted, platinum appears preferable for the exposed electrode, and in accordance with the present invention, the electrode arrangement of a ribbon wound in spaced turns as in Figs. 1 and 5 is very distinctly superior, especially for high accuracy in response to residual chlorine concentrations. In all cases electrode substances (such as the foregoing materials suitable in the case of chlorine detection) that undergo no deleterious reaction with the liquid under test may be defined as inert, and are greatly preferred, according to present understanding. As stated above, the spaced arrangement of the relatively expensive platinum (or other metal) over a given area appears to afford practically the same results as if the area were entirely covered. Equal results are not accomplished, however, where a continuous, compact piece or annulus of electrode metal is employed, having a surface area only equal to that actually exposed, for instance, by the platinum ribbon in either type of cell; area for area of the metal itself, the illustrated arrangements provide much better efficiency, and much greater sensitivity or current output.

Cells embodying features of the present invention are remarkably rugged, sensitive and capable of reliably reproducible results in detecting any of a wide variety of chemical characteristics, of which active chlorine has been given as an important example but of which other examples include other oxidizing agents, and reducing agents. The cells may be used for delicate determinations of individual liquid samples, as in the titrator illustrated, or may be embodied in automatic equipment such as for measuring, recording or control with chlorine supply apparatus or other chemical operations, the electrical terminals of the cell being connected to appropriate translating means and successive portions of the liquid under test being supplied to the cell either as separate quantities or in a continuous flow traversing the cell, by the provision of means such as the inlet and outlet conduits 122, 123 of Fig. 5. The illustrated cells are of notable advantage for aqueous solutions, especially very dilute solutions exemplified by drinking water containing residual chlorine, i. e. in providing an effective response to changes of chlorine content, whereas the described cell characteristics of large electrode area, close spacing and rapid agitation, particularly as embodied in Figs. 5 to 8, may sometimes even be disadvantageous for solutions of high concentration, in that the electrical response may then reach a region of saturation where sensitivity to change is absent or at least impaired.

In all cases the rapidly rotating cylindrical member provides a desirably violent agitation and circulation of the liquid, especially in the short path between the exposed electrode and the porous partition structure, promoting full realization of desired electrical effects, thorough break-up of air bubbles, and in the case of titration, rapid and complete mixing of the reagent. Since the current available from the cell decreases with decrease of the agitative motion below speeds of rotation such as mentioned above, and since a short electrical path and a substantial electrode area are critically desirable for useful sensitivity, supplemental features promoting these conditions are of great advantage, including the arrangement of the rotating element with a lower bearing 33 or 145 as well as an upper bearing, the arrangements for electrical connection, and other parts permitting an extremely high speed of agitative rotation without mechanical or electrical derangement. The alternating turns of electrode and porous diaphragm structure around a cylinder enclosing the reference half-cell, in Figs. 1 and 3, constitute a device of peculiarly compact, sensitive and yet rugged nature, providing a rigidly fixed yet remarkably short electrical path that is subjected to violent agitation.

Summarizing with respect to the titrating operation, free available chlorine in the water in contact with the platinum electrode effects current flow, indicated by the meter 75. Addition of arsenite reduces the amount of chlorine in solution and likewise the current flow, each such addition producing a decrease in current as long as chlorine is present. When all the chlorine is reduced, further addition of arsenite causes no change in current, and thus determines the end point of the titration; from the amount of reagent used to reach the end point, the amount of chlorine present can be calculated.

Sodium arsenite reacts readily with free chlorine, i. e. active chlorine in the so-called hypochlorous or hypochlorite form, but does not react at an appreciable rate with chloramines in any period of time (even of minutes) ordinarily available as a titration step; it will be understood that residual chlorine may often exist in combination with nitrogen, chiefly in the form of chloramines, and yet may require measurement as active chlorine. Response to chloramines may be obtained, however, by adding potassium iodide to the water under test, before titration. The potassium iodide reacts with chloramine, and likewise with free chlorine if any is present, to liberate iodine in proportion, and the iodine can then be reduced with sodium arsenite, i. e. titrated exactly as chlorine, to obtain a determination which represents the total residual chlorine, including that present in the chloramine form. If both types of chlorine are present or suspected, a preferred method is to titrate first for free chlorine (without the iodide); then potassium iodide can be added and the titration continued to determine the amount of chloramine present. In that way each type of residual chlorine can be determined separately in the presence of the other. The present titrator may thus be especially useful in connection with practice of the break-point process, as will now be apparent upon reference to the above-cited paper by Marks and Glass.

With apparatus of the character described titration for active chlorine can be accurately effected to within 0.01 p. p. m. at room temperature, the pH being preferably maintained at a value of approximately 7.0. A buffer, e. g. a so-called standard phosphate buffer, can be added, if necessary, to maintain such pH value. In all cases of chlorine detection, maximum realization of the benefits of the described cell structures appears to be had within a particular pH range of the water under test; e. g. where the pH is less than about 4.5 and particularly as low as 1 or 2, the devices may be of less distinct advantage, and at pH values much above 7 the sensitivity may be markedly less.

Where a cell of the invention is employed to obtain continuous or other direct reading of residual chlorine content or changes in residual, the electrical response will ordinarily be restricted to "free" chlorine (i. e. hypochlorous or the like), but will extend to include chloramines if potassium iodide is added to the water under test before it reaches the cell. In both continuous reading and individual testing, however, a response to chloramines may also be had in another way. Thus where the electrode 45 or 135 is of silver (as described) or a more noble metal the cell is ordinarily not responsive to chloramines without an added reagent, but if less noble metals are used, such sensitivity appears and increases as the metal becomes less noble; in fact a full response to chloramines as well as to free chlorine can be had by making the electrode 45 or 135 of a highly active metal, although the device may then be somewhat less satisfactory in other respects.

It is to be understood that the invention is not limited to the specific devices herein shown or described but may be embodied in other forms without departure from its spirit as defined by the following claims.

I claim:

1. In electrical cell apparatus for detecting a chemical characteristic of a liquid, in combination, a pair of members with closely spaced opposing coaxial surfaces comprising similar figures of revolution and disposed to receive the liquid under test between the surfaces, each member having its said surface lying wholly along its corresponding figure of revolution and wholly encircling its axis throughout its axial extent, the inner one of said members including at least a multiplicity of conductive portions throughout its surface to constitute an electrode, the outer member completely surrounding all of the said conductive portions of the inner member, one of said members having associated means to rotate the same for agitation of the received liquid throughout the space which completely encircles the inner member between said inner member and the outer member, and one of said members including permeable means exposed on one side to the received liquid at least at a multiplicity of localities throughout its surface, means including another electrode on the other side of said permeable means for electrolytic connection to the liquid through said permeable means, and means electrically connected to said electrodes for detecting electrical effects representative of the aforesaid chemical characteristic of the liquid.

2. In electrical cell apparatus for detecting a chemical characteristic of a liquid, in combination, a body having a completely cylindrical outer surface, spaced, electrically connected portions of conductive material distributed all around said surface throughout an area of at least about 1½ square inches thereof, said body being disposed for exposure of said material, as an electrode, to the liquid under test, a body having an inner completely cylindrical surface coaxially surrounding the first body and spaced not more than about ⅛ inch therefrom to confine the liquid in an annular cylindrical channel all around the electrode, said second body having its said inner surface completely encircling said first body throughout the axial extent of said electrode, one of said bodies comprising permeable structure exposed to the liquid in the channel at the cylindrical surface of the body, means for rotating one of said bodies to agitate the liquid in the channel, electrolytic means for effecting electrical connection to said liquid through said permeable structure, and means electrically connected to said electrode and said last mentioned means, for detecting electrical effects representative of the aforesaid chemical characteristics of the liquid.

3. In electrical cell apparatus for detecting a chemical characteristic of a liquid, in combination, a helical electrode structure comprising spaced turns of conductive material lying in a completely encircling surface of revolution and mounted for exposure to the liquid under test, permeable structure having a configuration lying in a similar, completely encircling surface of revolution and mounted in closely spaced coaxial relation to said electrode turns, to constitute a porous partition exposed on one side to the liquid under test, one of said structures surrounding the other, and means for rotating one of said structures to agitate the liquid between said electrode and said permeable structure, the other, surrounding structure completely encircling the other structure at a radial distance therefrom of not more than about ⅛ inch.

4. In electrical cell apparatus for detecting a chemical characteristic of a liquid, in combination, a body having a completely cylindrical outer surface, a winding of spaced turns of conductive material on said surface, said winding being distributed over a cylindrical area of at least about 1½ square inches on said surface, said body being disposed for exposure of said material, as an electrode, to the liquid under test, a body having an inner, completely cylindrical surface coaxially surrounding the first body in completely encircling relation substantially throughout the axial extent of said winding, to confine the liquid in an annular cylindrical channel around the electrode, said inner surface of said second body being coextensive with at least said cylindrical area of the first body and being spaced from the first body by not more than about ⅛ inch, and means for rotating one of said bodies at a rate of more than 1000 R. P. M. to agitate the liquid in said channel.

5. In electrical cell apparatus for detecting a chemical characteristic of a liquid, in combination, a cylindrical member having mutually spaced portions of conductive material distributed around its outer surface to constitute an electrode, a member comprising a coaxial cylindrical wall surrounding said first-mentioned member and closely spaced therefrom, said members being disposed to receive the liquid under test between them, said first-mentioned member comprising permeable structure exposed at the said surface of the member to the liquid between the members, said permeable structure consisting of permeable material, and said first-mentioned member including portions of impervious insulating material separating the aforesaid conductive material from the said permeable material, means for rotating said second-mentioned member to agitate said liquid, and electrolytic means for effecting electrical connection to said liquid through said permeable structure.

6. In electrical cell apparatus for detecting a chemical characteristic of a liquid, in combination, a hollow cylindrical member having spaced electrically connected portions of conductive material distributed around its outer surface to constitute an electrode, said member comprising porous structure exposed at the said outer surface intermediate the conductive portions, to constitute a porous partition between the exterior and interior of said member, said member also comprising impervious insulating structure beneath the conductive material for supporting the same intermediate successive portions of the porous structure, and a rotatable impeller coaxially disposed around said member in close proximity to said outer surface, said member and impeller being disposed to receive the liquid under test between them.

7. In electrical cell apparatus for detecting a chemical characteristic of a liquid, in combination, a hollow member having an outer cylindrical surface including conductive portions to constitute an electrode and permeable portions to constitute a porous partition in the wall of the hollow member, said member including impervious insulating material beneath the conductive portions for supporting the latter between the permeable portions, and means including a cylindrical impeller surrounding said member for effecting exposure of the aforesaid outer surface to the liquid under test, in rapid agitation.

8. In electrical cell apparatus for detecting a chemical characteristic of a liquid, in combination, a vessel to receive the liquid under test, a hollow cylindrical member in the vessel having spaced electrically connected portions of conductive material distributed around its outer surface to constitute an electrode, and having permeable structure exposed at said surface intermediate the conductive portions to constitute a porous partition in the wall of the hollow member, a cylindrical impeller coaxially disposed around and close to said outer surface, said impeller being radially spaced from the outer surface of the cylindrical member by not more than about ⅛ inch, means for rotating said impeller, electrolytic means including another electrode and extending into the hollow member, for electrical connection to the liquid in the vessel through said porous partition, and means electrically connected to said electrodes for detecting electrical effects representative of the aforesaid chemical characteristic of the liquid.

9. In electrical cell apparatus for detecting a chemical characteristic of a liquid, in combination, a hollow member of impervious insulating material having a cylindrical outer surface and disposed for exposure of said surface to the liquid under test, a winding of spaced turns of platinum ribbon around said surface to constitute an electrode, permeable structure comprising turns of porous material inlaid in said surface intermediate the electrode turns and communicating with the interior of the member, an impeller comprising a coaxial cylindrical wall closely surrounding said surface, means for rotating the impeller, including a shaft axially traversing the hollow member, and a tubular conductive electrode member surrounding and insulated from said shaft in the hollow member, said hollow member being adapted to receive an electrolyte around said tubular electrode and in contact with the inner side of said permeable structure.

10. In electrical cell apparatus for detecting a chemical characteristic of a liquid, in combination, an electrode comprising conductive structure lying in a completely cylindrical surface, a permeable member comprising a coaxial, completely cylindrical wall surrounding said electrode in fully encircling relation thereto, said electrode and member being disposed to receive the liquid under test between them, means for rotating the electrode, means including another electrode separated from the first electrode by said permeable member, for electrolytic connection to the liquid between the first electrode and said member, and means electrically connected to said electrodes for detecting electrical effects representative of the aforesaid chemical characteristic of the liquid.

11. In electrical cell apparatus for detecting a chemical characteristic of a liquid, in combination, a completely cylindrical member having its outer cylindrical surface constituting an electrode and disposed for said surface to be exposed to and surrounded by the liquid under test, permeable means comprising a completely cylindrical porous member fully encircling the first member and having its inside surface surrounding and closely spaced from said electrode surface by a radial distance of not more than about ⅛ inch, for exposure of said inside surface to the liquid around the electrode, means for rotating one of said members to agitate the liquid between said electrode and permeable means, means including another electrode on the other side of said permeable means, for electrolytic connection to the liquid through said permeable means, and means electrically connected to said electrodes for detecting electrical effects representative of the aforesaid chemical characteristic of the liquid.

12. In electrical cell apparatus for detecting a chemical characteristic of a liquid, in combination, a member having a completely cylindrical outer surface, means for rotating said member, including a shaft extending axially of the member, a winding of spaced turns of platinum ribbon around said surface to constitute an electrode, a coaxial, completely cylindrical wall of porous material closely surrounding said surface in fully encircling relation thereto, said member and wall being adapted to receive the liquid under test between them, means defining a chamber around the exterior of said porous wall, to receive an electrolyte, and an electrode disposed for exposure to said electrolyte.

13. Electrical cell apparatus as recited in claim 12 wherein the chamber-defining means comprises a cylindrical vessel to enclose the aforesaid member and wall and to contain the liquid under test, said vessel having an inner surface structure providing an annular recess to constitute said chamber around the porous wall, said wall being sealed against said structure to separate the chamber from the liquid under test, and said apparatus including liquid-retaining means in liquid communication with said chamber, in which said second-mentioned electrode is disposed.

14. Electrical cell apparatus as recited in claim 12 wherein the shaft is electrically connected to the electrode ribbon and extends vertically above the member, said apparatus including a mercury-containing cup mounted on the upper end of said shaft to rotate therewith and having a centrally apertured closure, and a stationary needle projecting through the aperture of the closure into the mercury in said cup for electrical connection thereto.

CHARLES F. WALLACE.

REFERENCES CITED

The following references are of record in the file of this patent:

UNITED STATES PATENTS

| Number | Name | Date |
| --- | --- | --- |
| 342,131 | Perkins et al. | May 18, 1886 |
| 579,236 | Kellner | Mar. 23, 1887 |
| 799,061 | Kellner | Sept. 12, 1905 |
| 1,008,383 | Sparre | Nov. 14, 1911 |
| 1,080,177 | Still | Dec. 2, 1913 |
| 1,388,216 | Thatcher | Aug. 23, 1921 |
| 1,851,688 | Warren | Mar. 29, 1932 |

OTHER REFERENCES

"Journal of American Water Works Association," volume 34 (1942), pages 1227 thru 1240.